United States Patent [19]
Abels et al.

[11] 3,870,935
[45] Mar. 11, 1975

[54] VEHICLE DRIVE WITH TWO ELECTRIC MOTORS

[75] Inventors: Theodor Abels, Breunsberg; Siegfried Puschel, Aschaffenburg, both of Germany

[73] Assignee: Linde Aktiengesellschaft, Wiesbaden, Germany

[22] Filed: Feb. 13, 1973

[21] Appl. No.: 332,226

[52] U.S. Cl. ................ 318/52, 318/85, 180/6.5
[51] Int. Cl. ............................................. H02p 5/46
[58] Field of Search ............... 318/8, 52, , 85, 345; 180/6.5

[56] References Cited
UNITED STATES PATENTS

| | | | |
|---|---|---|---|
| 3,534,239 | 10/1970 | Risberg | 318/52 |
| 3,559,008 | 1/1971 | Stut et al. | 318/8 |
| 3,596,154 | 7/1971 | Gurwicz | 318/52 |
| 3,728,596 | 4/1973 | Hermansson | 318/52 |
| 3,756,335 | 9/1973 | Eisele et al. | 318/52 X |

*Primary Examiner*—T. E. Lynch
*Attorney, Agent, or Firm*—Karl F. Ross; Herbert Dubno

[57] ABSTRACT

An electric-powered vehicle, e.g. of the fork-lift, plant-utility or other type in which a pair of electric motors are driven by power derived from a rechargeable battery, has two motors for driving wheels on the opposite sides of the vehicle and capable of differential operation. The two motors are connected in parallel to a single pulse control (pulse generator) and are selectively excited or de-energized or accommodate differential action during turns of the vehicle, but are connected jointly to the single pulse control when no differential action is required.

10 Claims, 3 Drawing Figures

VEHICLE DRIVE WITH TWO ELECTRIC MOTORS

FIELD OF THE INVENTION

The present invention relates to electrically propelled vehicles and, more particularly, to a vehicle having a pair of electric motors, each driving a propelling wheel or a respective side of the vehicle and adapted to permit differential operation of the two wheels.

BACKGROUND OF THE INVENTION

The term "electrically propelled vehicle" is used herein to identify a vehicle system in which one wheel on each side of the vehicle is electrically powered, i.e. is driven by one or more electric motors, using the stored energy of a battery, fuel cell or other source of electric power carried by the vehicle. Such vehicles have found a permanent place in industrial plants, dockyards, warehouses and the like in which the fumes from internal combustion engines have proved to be detrimental to the health of the personnel. Such vehicles include fork-lift and utility vehicles which normally comprise a vehicle chassis carrying a seat for the operator or a control station at which the operator can stand, a battery which may be recharged overnight when the vehicle is not in use, respective electric motors driving the powered wheels of the vehicle, a steering system enabling the vehicle to be directed along selected paths and electrically controlled means for performing lifting or other operations with the vehicle. While the present invention is particularly adapted to vehicles of this latter type, it should be noted that other electrically propelled vehicles may also use the principles of the invention, for example a road vehicle in which all or part of the power for propelling the vehicles is derived from a pair of electric motors.

In electrically powered vehicles of the industrial type mentioned earlier, it has been proposed to provide two such electric motors and a single pulse control or generator for providing a pulse train for each of two motors, thereby driving them at equal rates with equal torques. The motors may be of the series type in which an electric winding or field coil is provided in series with the armature via brushes and the like (so-called "series wound direct-current motor") and the pulse control may be a source of pulses of a given polarity derived by the periodic or variable-cadence switching of an electronic switch in series with the power source and the motor. The power source is customarily a battery recharged during inoperative periods of the vehicle.

While such systems are unobjectionable during straight-line travel of the vehicle, turns and curves of the vehicle path require differential operation of the two wheels so that, for example, the wheel traveling along the inner limb of the curve must be slowed relative to the outer wheel or the wheel negotiating the outer limb of the curve must be accelerated relative to the inner wheel. The use of a pulse train for each of two parallel motors has not heretofore permitted such differential operation and the art has therefore settled upon resistance switching of the two motors or connecting the two motors in series to a single pulse control.

Electrically powered vehicles of the type described above, however, have heretofore operated in low-voltage systems wherein the 24-volt battery, for example, supplied the motors and the auxiliary electrical equipment of the apparatus. When the motors are to be operated in series, a 24-volt supply is not satisfactory since 48 volts are necessary to drive the system when two 24-volt motors are connected in series as described. However, a 48-volt supply is not desirable for the auxiliary equipment, e.g. lights, hydraulic pumps, motors, lifting and conveying devices and the like. All such equipment can be expected to be used for an electrically powered vehicle depending upon the ultimate purpose thereof. Consequently, where the vehicle is an excavating apparatus, has a turret, operates specialized tools or the like, electrical control systems, cables and motors are customarily provided and the importance of standardizing the electrical characteristics of such devices is not to be ignored. Thus, when a 48-volt system is required to overcome the aforementioned disadvantage of lack of differential action, either two electrical supply networks (one of 48 volts and other of 24 volts) must be provided or the 24-volt auxiliary circuits must be replaced by 48-volt circuits and associated devices operable at 48 volts. This of course is highly disadvantageous and undesirable.

OBJECT OF THE INVENTION

It is the principal object of the present invention to provide an improved drive system for an electrically powered vehicle in which the aforedescribed disadvantages are obviated.

It is another object of this invention to provide an electrically powered vehicle with pulse control using a single voltage-supply network and capable of undergoing differential operation in negotiating curves or the like.

SUMMARY OF THE INVENTION

These objects and other which will become apparent hereinafter are attained in accordance with the present invention, by providing a vehicle having a pair of propelling wheels on opposite sides of the vehicle, respective electric motors connected to these wheels and a pulse control or pulse-generating circuit. The electric motors are connected by parallel circuits to the pulse control with each branch of the circuit including a switch between the field coil and the pulse-generating circuit; the armatures of the motors are connected in series with the field coil and between the electrical return conductor and the field coil. According to the principles of the present invention, switch means or like circuitry is provided to de-energize the electric motor along the inner limb of a curve so as to permit the electric motor driving the wheel along the outer limb to operate at a differentially higher speed than the inner motor.

According to an important feature of the invention, the pulse control (drive-pulse generator) has a conductor or lead which is branched to both drive motors, each branch having a switch in series with the field coil or winding and the armature of the respective (series-wound) motor. On the opposite side of these motors, they are connected together to a common conductor or lead in which is provided a sensor resistance which can be feedback coupled to the pulse control. According to another important feature of this invention, each armature is bridged by a parallel-connected rectifier-type armature diode while a third diode is connected between the common conductor or lead at the opposite side of the motor, mentioned earlier, and the branch conductors tied to the first-mentioned sides of the motors. The latter diode serves to maintain a current flow in the period in which intermittent cutoff of the drive current, resulting from pulse control, causes a decay of the field.

For normal forward drive, the two motors are placed in parallel with one another across the direct-current source (i.e. the vehicle battery) in series with the pulse control circuit which, as noted, delivers a train of power pulses to the motors in parallel so that both motors are driven simultaneously and with equal torque. The motors are coupled with the vehicle wheels and the vehicle is propelled along a straight-line path with difficulty, much as the two parallel-connected motors of a conventional electric drive are energized by a single pulse-generating circuit. For curvilinear motion, as when the vehicle turns to the right or to the left, the switches are operated (preferably automatically from the steering linkage but also by the operator if desired) to cut out the motor along the inner limb of the curve while the outer-limb motor remains effective, thereby achieving differential rotation of the driving wheels. Furthermore, when counter-current breaking is desired, the system of the present invention may, as described, permit a higher armature voltage to develop at one motor. This may create difficulties because the armature having the higher voltage is connected via the common connecting line or conductor to the other motor and can bring this motor into an electrically blocked state. Consequently, we may employ switch means for cross connecting the two motors, i.e. for connecting the field coil or winding of one motor in series with the armature of the other and vice versa. Here, however, a disadvantage can arise in that the motor along the inner limb of the curve cannot readily be cut off and cross connection maintained.

These disadvantages can be obviated by providing in each branch leading from the pulse control or generator a diode which is only open to the associated motor (i.e. is conductive only in the direction in which pulses may be applied to the motor) and which block during counter-current braking. Consequently, when a higher voltage is developed in one motor the diode blocks application of the higher voltage to the other. The free running diode must, in this case be connected from the common conductor of the two motors to the branches ahead of the diodes open to the respective motor.

According to another feature of the invention, expensive diodes of the latter type, which must be dimensioned to carry the entire current traversing the respective motor are eliminated by providing a connecting circuit in the form of a bridge in which each end of the bridge is connected to one of the motors between its field coil and its armature. During curvilinear travel the motor associated with the inner limb of the curve operates slower than the motor associated with the outer limb of the curve and the bridge is conductive to brake the inner-limb motor (counter-current braking) or to drive the inner-limb motor more slowly, thereby heightening the adaptability of the vehicle to such curvilinear motion.

This system has the advantage, moreover, that one of the two armature diodes mentioned above can be eliminated, since a single armature diode is then used for both motors. The armature diode is then connected by the common conductor of the two motors and to the bridge.

In the basic circuit of the present invention, there is provided a pulse-generating means which may comprise a single pulse generator for both motors or respective pulse generators for each motor, the pulse-generating means having an output which is connected by conductor branches to a pair of switch members of each switch associated with a given motor. Each switch member is connected in series with a respective field coil of the field winding of the motor, the field coils being energizable alternatively to drive the motor in the forward or the reverse sense. According to the principles of the invention, both field coils of each motor are connected to one side of the armature at a respective junction point while the other sides of the armatures are connected together via a common conductor in circuit with a sensor whose output is applied to the pulse-generating means in a feedback circuit.

Between each junction point and the common conductor there is provided an armature diode which may be individual to the armature or, when a bridge circuit is provided, may be common to both armatures. In the latter case a bridge conductor connects the junction points of both motors and the armature diode is tied between the common conductor and the bridge conductor.

The bridge conductor is preferably provided with respective switches (cutout switches) between each junction point and the point at which the armature diode is connected to that conductor, the cutout switches being operated when the respective switch in series with the field winding is open circuited as will be apparent hereinafter. In an embodiment of the invention in which two pulse generators are provided, one for each motor, the two switch members of each winding switch are connected between output of the respective pulse generator and the respective field coils, while a comparator-type sensor is connected between the unction point of each armature and the respective winding. The output of this sensor and the output of the feedback sensor are applied to an amplifier which, in turn, selectively applies a feedback signal to each of the pulse generators. In this embodiment, a respective free-running diode is connected between the common conductor of the junction of each winding switch with the output lead from the respective pulse generator.

In all embodiments, a steering-position-responsive device may be provided between the steering linkage or the steerable wheels to operate automatically the winding switch which is to be open circuited when its motor is to constitute the motor of the inner limb of a curve.

The system in which a single armature diode is provided for both armatures, i.e. the bridge circuit mentioned earlier, eliminates one of the armature diodes and thereby represents a saving in cost. When, in addition, the bridge network is provided with cutout switches, the cutout switches may remove the possibility that one armature will apply a blocking potential to the other and thereby create difficulties.

In general, the bridge operation is effective in the following manner. When both switches (cutout switches) are closed, the speed of the inner motor is reduced and the counter-current in the armature which passes opposite to the battery or driving current is likewise reduced and the voltage drop in the armature is also reduced in accordance with the distribution of the voltage drop between armature and field winding. At the junction point between the field winding and the armature, the potential is increased over the potential of the junction of the other motor so that a current flows to the motor of the outer limb of the curve. This increases the countervoltage or back e.m.f. of the outer motor and thus the armature filed is strenthened with respect to the stator field. A similar phenomenon occurs when the outer wheel is driven more rapidly than the inner wheel. During counter-current braking, the bridge also is effective. The counter-current braking produces a current flow through the armature diodes and through the free-running diodes which is then passed through one of the motors, the other having a higher back e.m.f. One motor can thus be blocked while the other has a reduced braking effectiveness. When the bridge is provided between the junction point of the field winding and armatures, an escalation of the potential is possible so that the braking operation is analogous to the drive operation described above with respect to the distribution of current.

DESCRIPTION OF THE DRAWING

The above and other objects, features and advantages of the present invention will become more readily apparent from the following description, reference being made to the accompanying drawing in which.

SPECIFIC DESCRIPTION

Figure 1:
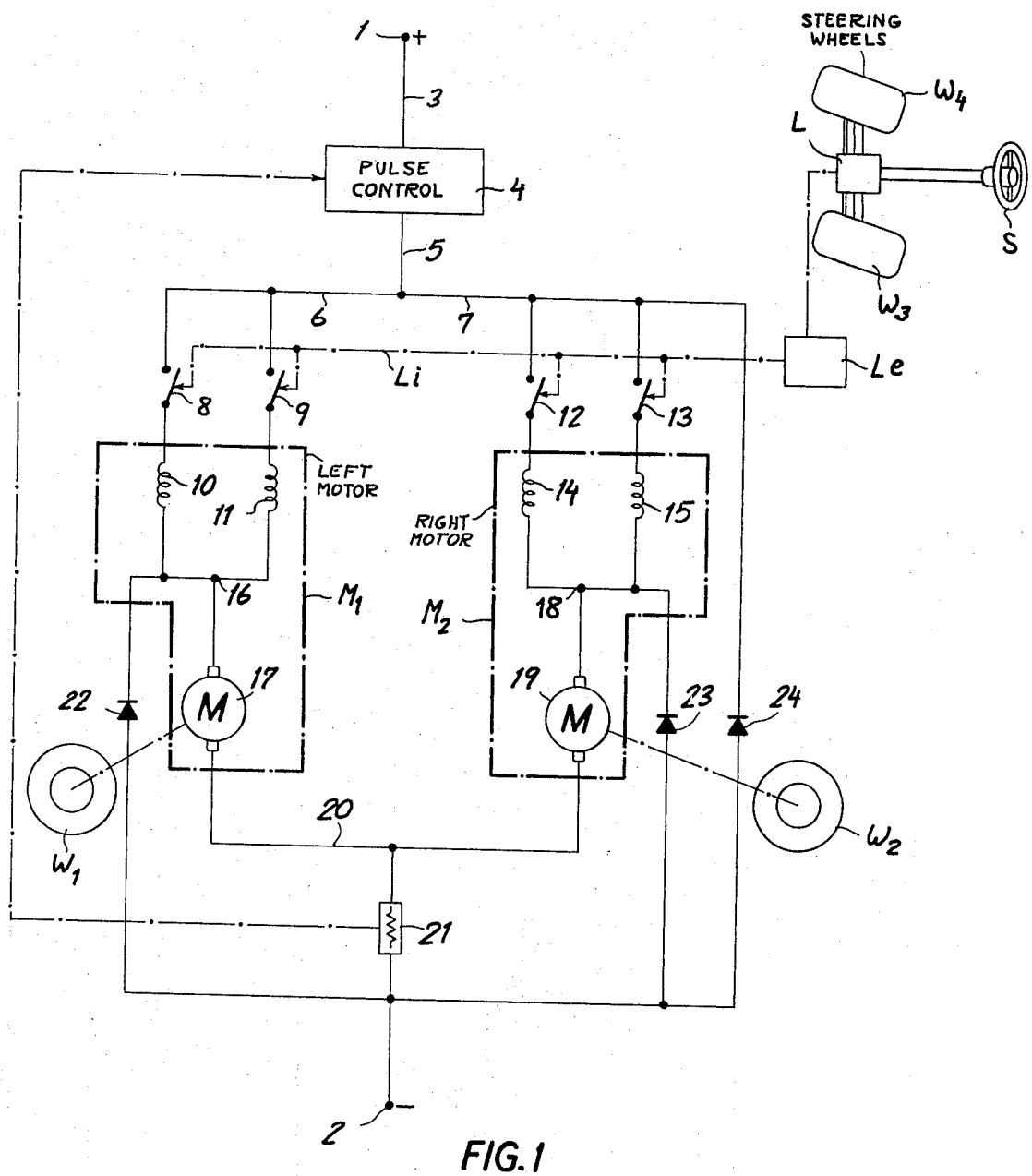
FIG. 1 is a circuit diagram of a vehicle drive system shown in simplified form, for a vehicle having two motors driving powered wheels on opposite sides of the vehicle.

In FIG. 1 of the drawing, there is shown a circuit in which the terminal 1 represents the positive terminal and a terminal 2 represents the negative terminal of a battery (not illustrated) of a motor vehicle. The motor vehicle is of the electrically-powered type (e.g. a vehicle having a storage battery which is rechargeable for driving the wheels $W_1$, $W_2$ of the vehicle), in which a single voltage circuit is provided. The battery is a stack of cells capable of delivering, for example, 24 volts for operating the wheels of the vehicle and providing electric current for all other electrically operable or controlled service appliances on the vehicle.

The positive terminal 1 is connected by a conductor or lead 3 to the pulse control circuit 4 which is represented in block-diagram form. This pulse-control circuit may be a pulse generator producing a train of motor-drive pulses with a peak amplitude, for example, of 24 volts (corresponding to the voltage of the battery). As is well known in connection with such circuits, the pulses can be applied to series-wound direct-current motors to operate them at a rate determined by the frequency of the pulses and with a torque output which is a function of the electrical power supplied. Since the basic control circuit includes a conventional pulse generator, means for adjusting the frequency or period thereof and a feedback network for stabilizing this frequency or period, the circuit is conventional and need not be described in detail here. For convenience the circuit 4 has been represented as a block and may be considered to include a solid-state electronic switch in series with the conductor or lead 3 and having its output electrode connected to the conductor or lead 5, an oscillator of, for example, the unijunction-transistor type connected to trigger the control electrode of the electronic switch with a variable but feedback-stabilized cadence. Such triggering circuits may be found in "POWER CIRCUITS," RCA Electronic Components, Harrison, N.J., 1969.

The output of the pulse control 4 is applied via conductor or lead 5 to a pair of branch conductors or leads 6, 7, each of which is provided with a pair of on-off type mechanical (manual), electromechanical (relay), or electronic (SCR) switches 8, 9 and 12, 13.

To conductor or lead 6, there are connected the two parallel switch members 8 and 9, each of which lies in series with one field coil 10, 11 of the field winding of an electric motor $M_1$ whose armature is placed in the circuit by a pair of brushes represented at 17. The field coils 10 and 11 are wound oppositely or positioned for energization of the motor in opposite senses so that one of the field coils is excited when the motor is to be driven in one direction whereas the other field coil of the motor pair is excited when the motor is to be driven in the opposite sense.

Similarly, the branch conductor or lead 7 is provided with the two switch members 12 and 13 which lie in series with the field windings 14 and 15, each of which is excitable to drive the second motor $M_2$ in one sense or the other.

The field coils 10 and 11 or, more accurately, whichever of these field coils is excited, is connected at a junction 16 with the armature 17 of the left-hand motor of the vehicle, with which the field coils 10 and 11 are associated. Similarly, a junction 18 connects the field coils 14 and 15 to the armature 19 of the right-hand vehicle motor. The armatures 17 and 19 are connected on their opposite sides (also via brushes) to a sensing resistor 21 and in series with the latter to the negative terminal 2 of the battery. The sensor 21, of course, provided a feedback signal as represented by dot-dash lines to the pulse control 4. In parallel to the armature 17, there is placed an armature diode 22 of the rectifying type, poled to block a positive signal passing between terminal 16 and the negative terminal 2 of the battery while a corresponding armature diode 23 is provided in parallel with the armature 19 between the terminal 2 and junction 18. A free-running diode 24, also of the rectifier type, connects the negative terminal 2 of the battery to the branch conductors 5, 6, 7 and is poled to block positive poles passing in the direction from these conductors 5 – 7 to the negative terminal 2 of the battery. The term "rectifying diode" is used to identify a diode without a threshold in the forward direction which blocks any signal in the reverse direction but passes all signals in the forward direction.

In normal operation of the vehicle, either switch 8 and switch 12 or switch 9 and switch 13 are closed to drive the vehicle in the forward direction or in the reverse direction, respectively. The motor 10, 11, 17 and motor 14, 15, 19 are thereby driven in parallel by the pulse train produced at 4 to operate the vehicle wheels and propel the vehicle in the forward or reverse direction.

When, however, the vehicle is to negotiate a curve, the steering linkage L is deflected through a predetermined threshold angle to the right or to the left and either switch 8 or switch 12 is opened to de-energize the respective motor so that only the motor driving the wheel along the outer limb of the vehicle remains energized. The motor driving the inner-limb wheel is de-energized and its diode 22 or 23 functions to permit electrical braking at these wheels. It will be apparent that this system, during normal operation, has the effect of a system using two pulse controls, one for each motor, during straightline travel and effectively produces the difference in pulse frequency at the motors required for differential operation. Furthermore, the circuit of FIG. 1 permits a single voltage network to be used across the terminals 1 and 2.

Figure 2:
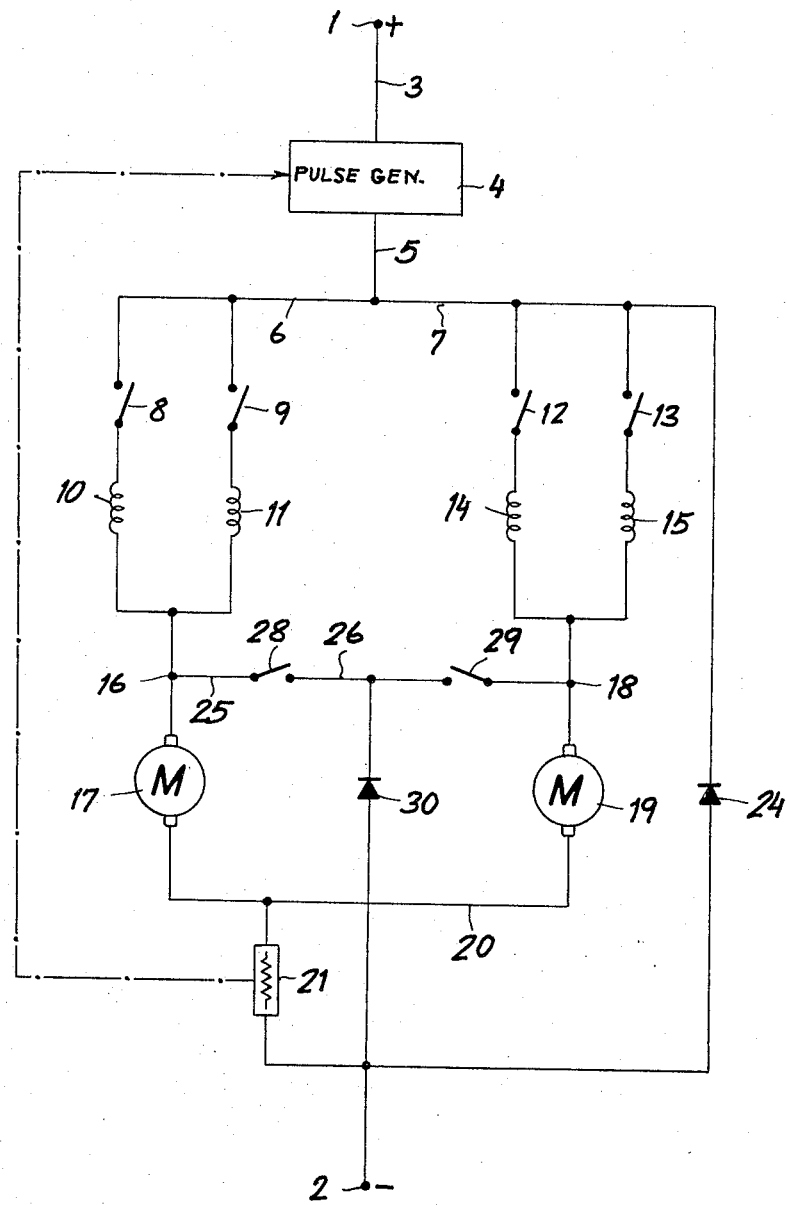
FIG. 2 is a circuit diagram illustrating a modification.
Figure 3:
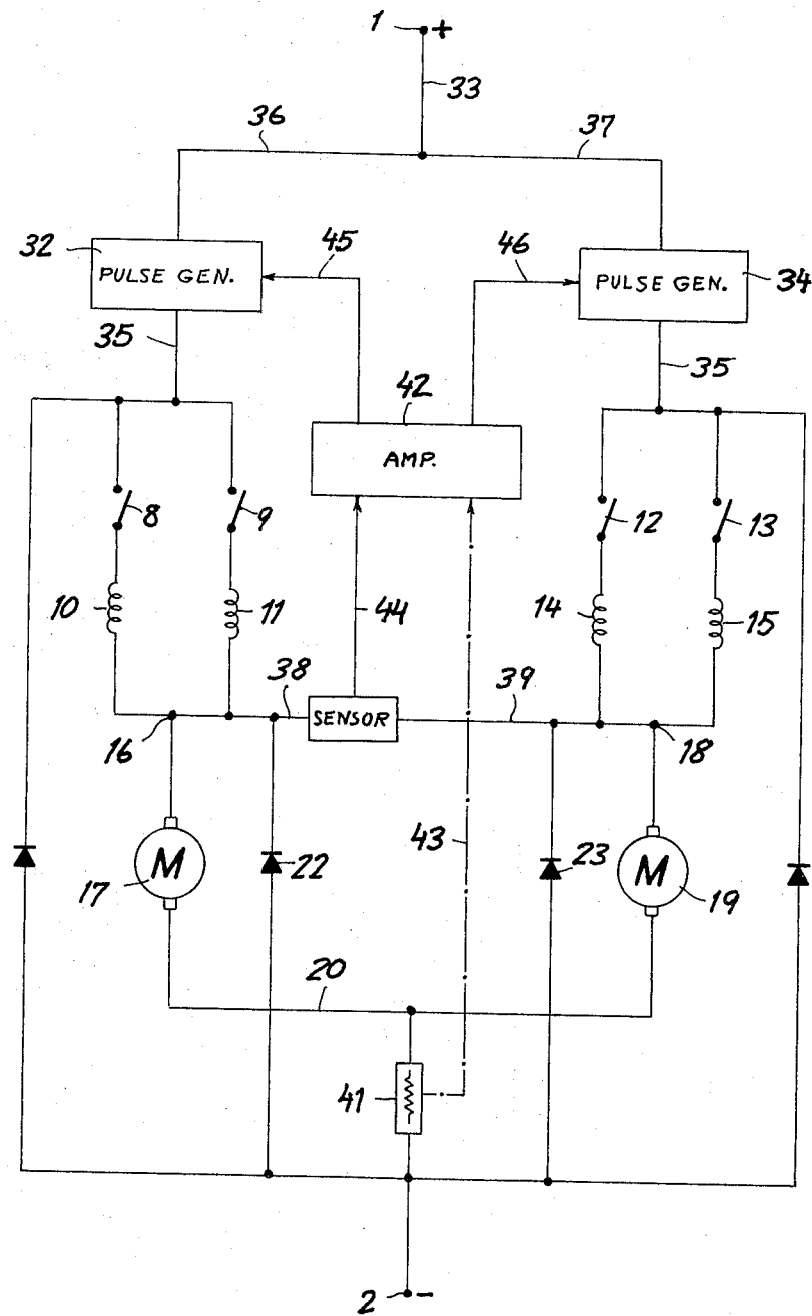
FIG. 3 is a vehicle drive illustrating still another embodiment of the present invention.

The circuits and systems of FIGS. 1 through 3 may be provided, if desired, with means responsive to the position of a pair of steerable wheels $W_3$ and $W_4$, controlled by a steering mechanism S and automatically open circuiting the switches 8, 9 or 12, 13 corresponding to the motor which would normally drive the powered wheel $W_1$ or $W_2$ along the inner limb of the curve. This mechanism is represented diagrammatically at L in FIG. 1 and can represent limit switches connected to an electromechanical device $L_e$ which, in turn, may operate the switches as represented by the dot-dash line $L_t$.

In the circuit of FIG. 2, which represents a modification of the system of FIG. 1 wherein a bridge network is provided for the motors whose armature windings are connected to a common conductor in series with the sensing resistor as one branch of the bridge, an armature diode forms another branch of the bridge and a pair of switches connected to the junction between the armatures of the motors and their respective field windings, constitute two additional branches of the bridge. In the embodiment of FIG. 2, elements 1 through 21 and 24 are identical to the elements of similar reference numerals in FIG. 1 and operate as originally described.

This circuit, however, differs from that of FIG. 1 in that the connecting point or junction 16 between the field coils or windings 10, 14 and the armature 17 is connected in series with a switch 28 between conductors 25 and 26. Similarly, the junction 18 between field windings or coils 14 and 15 and the armature 19 is connected in series with a switch 29 in conductor 26, 27. In place of the two armature diodes 22 and 23 of FIG. 1, the embodiment of FIG. 2 has a single armature diode 30 which bridges both of the armatures 17, 19 when the associated switches 28 and 29 are closed.

Thus between conductors 25 and 26 of connecting lead 25 through 27, there is provided the switch 28 while the switch 29 is provided between the conductors 26 and 25 of the connecting line 25 through 27. The switch 28 can be mechanically connected to the switches 8 and 9 or can be operated upon the operation of switches 8 and 9 via electrical means (electromechanical or electronic relays) so that, upon curvilinear motion of the vehicle, the motor 10, 11, 17 of the inner limb of the curve can have both of its field coils 10, 11 de-energized (switches 8 and 9 both open) at which time the switch 28 simultaneously opens. During the period of reduced operating rate of the motor 10, 11, 17, the armature 17 cannot be energized via lines 25, 26 and 27. The motor 10, 11 and 17 is thereby shut down while motor 14, 15 and 19 is fully effective, the armature diode 30 being effective in the intervals between excitations of the coil 14 or 15 to permit decay of the magnetic fields. Similarly, the switch 29 is so ganged with the switches 12 and 13 that, when the motor 14 through 19 is the inner-limb motor, the limit switch or other sensor of the steering mechanism open-circuits both field coils 14 and 15 and simultaneously open switch 29.

A somewhat more sophisticated circuit according to the invention has been shown in FIG. 3 in which elements 1, 2, 8 through 20, 22 and 23 are identical to the elements of FIGS. 1 and 2 with corresponding numeration and are supplied in the manner already described with respect to these elements.

From the positive terminal 1 of the battery, a conductor 33 leads to the branches 36 and 37 from which a pair of pulse controls 32 and 34 (pulse generators) are operated. The pulse generator 32 is connected to branch conductor 36 and the pulse control or generator 34 is connected to the branch conductor 37.

Each of the pulse controls or generators 32, 34 is connected to a pair of switches 8 and 9 or 12 and 13 via conductors 35. The switches 8 and 9 lie in series with the field windings or coils 10 and 11 while the switches 12 and 13 are in series with the field windings or coils 14 and 15 of the motor 14, 15, 19.

In place of the connecting conductor 25 through 27 of FIG. 2, the circuit of FIG. 3 comprises a pair of connecting lines 38, 39 tied to the respective motors at junction 16 and 18, respectively, between the field windings or coils 10, 11 or 14, 15 and the armatures 17 and 18 respectively associated therewith. Between the conductors 38 and 39, a sensor 40 is provided.

In this embodiment, moreover, the sensing restor 21, connected between the common conductor 20 of the armatures 17 and 19 and the negative terminal 2 of the battery is replaced by sensing resistor 41 which differs from the resistor 21 only in that the output of the sensing resistor was applied directly to the pulse generator in FIGS. 1 and 2 while the resistor 41 is connected to the amplifier 42 via the conductor 43.

The amplifier 42 is a summing amplifier and receives another input from the sensor 40 via a conductor 44. The amplifier 42 is connected via a conductor 45 with the pulse control or generator 32 and via a conductor 46 with the pulse control or generator 34.

The sensor 40 delivers a signal to the amplifier 42 which may be of one or another polarity, depending upon the relative loading of the two motors 10, 11, 17 and 14, 15, 19, whichever is greater, and an amplitude which is a function of the difference in torque developed at the two motors or the loading as noted. Depending upon the polarity, the signal is applied by the amplifier 42 either to the pulse control 32 or the pulse control 34 to increase the cadence or frequency of the current pulse for the outer-limb motor or decrease the cadence or pulse frequency by increasing the pulse interval for the inner-limb motor, thereby providing differential action between the wheels without permitting one of the two motors 10–11–17 or 14–15–19 to be overloaded.

In this embodiment, in spite of parallel operation of two motors 10, 11, 17 and 14, 15, 19, each with a respective pulse control or generator 32 or 34, differential operation of the wheels is possible together with a counter-current braking without blocking of either motor by a voltage generated by the other. The comparator 40 thus eliminates the need for cutout or interruptor switches such as have been provided at 28 and 29 in FIG. 2.

Because the circuit of FIG. 2 provides a bridge network including the conductors 25, 26 and 27 for the equalization of the different currents generated by the two motors during counter-current braking at the armatures 17 and 19, the field coils 10, 11 on the one hand and the field coils 14, 15 on the other are unaffected by the generated braking current since the connection 25, 26 and 27 is made between each armature and the respective pair of coils. A uniform braking of the two motors 10, 11, 17 and 14, 15, 19 is obtained in the embodiment of FIG. 2 as well.

The system of FIG. 2 has the possibility, during curvilinear travel upon exceeding a predetermined deflection of the steering wheels, to interrupt (via cutout switches 28 and 29) the braking operation of one side, the field current of the motor which remains effective not being desirable at both armatures. Thus the system avoids excessive braking at the motor which remains in circuit and guarantees that the motor along the inner limb of the curve will always operate at a slower speed.

It may be desirable to provide such a steering-linkage dependency for the system of FIG. 3 as well, and thus we may provide switches in conductors 38 and 39, equivalent to the switches 28, 29 shown in FIG. 2.

We claim:

1. In an electrically operated vehicle having a pair of driving wheels on opposite sides of the vehicle, a source of electric current, and respective motors operatively connected to said wheels, the improvement which comprises a control circuit connected between said source and said motors and including driving-pulse generating means in circuit with said source, respective switches connecting said generating means to said motors in parallel and operable to cut off one of said motors selectively to enable differential rotation of said wheels, each of said motors being a series-wound direct current motor having a field winding and an armature connected in series with one another, each of said switches being connected in series with the field winding and armature of a respective motor at one side thereof, the series network of field winding, switch and armature of both motors being connected together on one side thereof via a common conductor, a sensor provided in circuit with said common conductor and connected in a feedback path to said pulse generating means each of said field windings including a pair of field coils respectively excitable for driving the respective motor in opposite senses, each switch associated with the respective motor including a switch member in series with a coil of the respective pair, a free running diode connected between said common conductor and said pulse generating means across at least one of said motors, and at least one armature diode connected between said common conductor and across at least one of said armatures between said one of said armatures and the respective field winding.

2. The improvement defined in claim 1 wherein said vehicle has steerable wheels further comprising means responsive to the orientation of said steerable wheels for selectively operating said switches.

3. The improvement defined in claim 1 wherein a respective armature diode is provided across each of said armatures between said common conductor and a respective junction of each field winding with the respective armature.

4. The improvement defined in claim 1 further comprising a bridge network tied to each of said motors between a respective armature and its field winding and connected to said armature diode whereby said armature diode is effective for both said motors.

5. The improvement defined in claim 4, further comprising respective cutout switches in said network between the armature diode and the junction between each armature and the respective field winding and open-circuitable in conjunction with the respective switch in series with the field winding of the respective motor.

6. The improvement defined in claim 1 wherein said pulse generating means includes a single pulse generator and both said motors and a pair of branch conductors connected in common to said pulse generator, said free running diode being connected between said common conductor and both said branch conductors, each of said branch conductors being in series with a respective one of said switches, a pair of such armature diodes being provided across each of said armatures between said common conductor and a junction between each armature and the respective field winding.

7. The improvement defined in claim 1 wherein said pulse generating means includes a respective pulse generator assigned to each of said motors, and a sensor connected between said motors for selectively controlling said pulse generator.

8. The improvement defined in claim 7 wherein said sensor connected between said motors has an input connected to each motor between the respective armature and field winding.

9. The improvement defined in claim 8 wherein said pulse generating means further comprises an amplifier receiving an input from the sensor connected between both said motors and from said sensor connected to said common conductor and having outputs connected to said pulse generators for selectively applying feedback control signals thereto.

10. The improvement defined in claim 1 wherein said vehicle is provided with steerable wheels and means responsive to the deflection of said steerable wheels for selectively operating said switches.

* * * * *